United States Patent [19]

Altman

[11] Patent Number: 4,764,806
[45] Date of Patent: Aug. 16, 1988

[54] APLANATIC IMAGE COMBINER FOR USE IN PROJECTION TELEVISION SYSTEMS WITH REDUCED SPHERICAL AND COMA ABERRATION

[75] Inventor: Richard M. Altman, Woodland Hills, Calif.

[73] Assignee: TDS Patent Management, Inc., Scarsdale, N.Y.

[21] Appl. No.: 923,292

[22] Filed: Oct. 27, 1986

[51] Int. Cl.$^4$ .................... H04N 9/31; H04N 5/74; H04N 9/16; G02B 9/12

[52] U.S. Cl. ............................... 358/60; 358/64; 358/231; 358/237; 350/412; 350/432

[58] Field of Search ............... 358/60, 64, 231, 237; 350/412, 432

[56] References Cited

U.S. PATENT DOCUMENTS

| | | | |
|---|---|---|---|
| 2,188,581 | 1/1940 | Schlesinger | 358/237 |
| 2,831,053 | 4/1958 | Wieberdink | 358/60 |
| 4,027,328 | 5/1977 | Lessman | 358/64 |
| 4,151,554 | 4/1979 | Tucker | 358/60 |
| 4,163,990 | 8/1979 | Hodges | 358/64 |
| 4,249,205 | 2/1981 | Buchroeder | 358/60 |
| 4,453,178 | 6/1984 | Miyatake et al. | 358/60 |
| 4,595,263 | 6/1986 | Clarke | 350/432 |
| 4,607,280 | 8/1986 | Kurg | 358/60 |
| 4,679,069 | 7/1987 | Andrea et al. | 358/60 |
| 4,699,477 | 10/1987 | Clarke | 350/412 |

FOREIGN PATENT DOCUMENTS

| | | | |
|---|---|---|---|
| 56-28571 | 3/1981 | Japan | 358/60 |
| 57-5488 | 1/1982 | Japan | 358/60 |
| 58-44657 | 3/1983 | Japan | 358/237 |
| 59-10086 | 1/1984 | Japan | 358/60 |
| 60-35892 | 2/1985 | Japan | 358/60 |

Primary Examiner—James J. Groody
Assistant Examiner—Randall S. Svihla
Attorney, Agent, or Firm—Pollock, Vande Sande & Priddy

[57] ABSTRACT

An aplanatic image combiner. At least two image generating cathode ray tubes are provided having curved concave phosphor image generating surfaces. A set of dichroic mirrors are provided to combine images from each of the curved surfaces into a single combined image. A lens is positioned to transmit the combined image to an image magnification system. The lens has a curved surface forming an exit aperture for the image combiner. The radius of curvature of the lens is configured to be substantially the same as the radius of curvature of each of the concave image generating surfaces of the cathode ray tube. An image is generated to an image magnification system without generating any field aberration or astigmatic and chromatic aberration requiring correction in the magnification system.

14 Claims, 3 Drawing Sheets

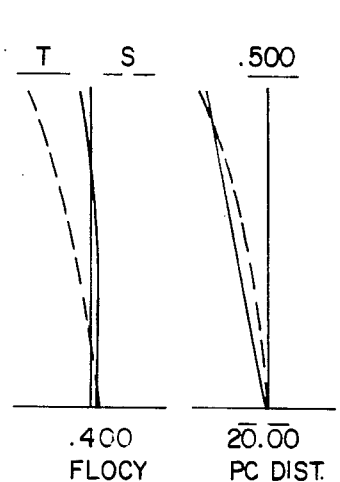
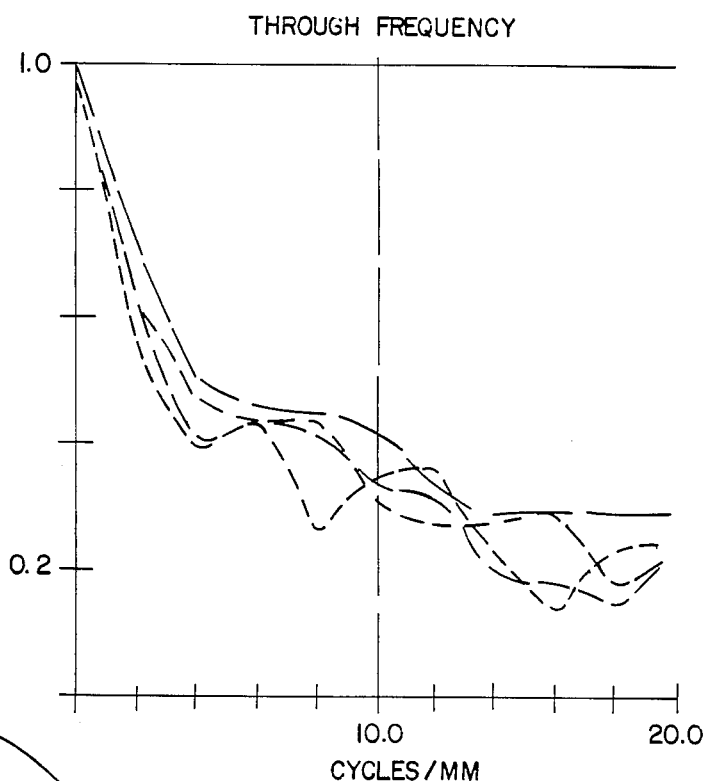
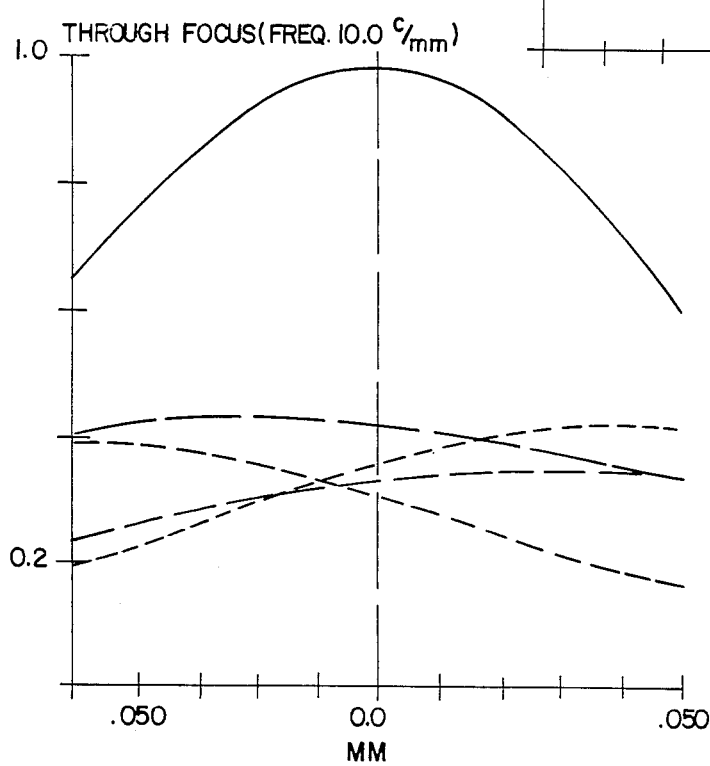
FIG 3
FIG 4A
FIG 4B

APLANATIC IMAGE COMBINER FOR USE IN PROJECTION TELEVISION SYSTEMS WITH REDUCED SPHERICAL AND COMA ABERRATION

BACKGROUND OF THE INVENTION

The present invention relates to projection television systems. Specifically, an aplanatic image combiner is described which provides for a curved entrance and exit surface for transmitting a curved image surface.

Projection television systems are known in the art. These systems have been developed to generate large screen images from a smaller cathode ray tube image generating surface. Conventional television signals in the raster scan format are demodulated and applied to three separate cathode ray tubes. Each of the cathode ray tubes is provided with a phosphor for generating one of the three primary colors red, green or blue. The images from these three cathode ray tubes are combined and projected through usually complex optics for enlargement in either a direct view or rear view projection system.

These systems have traditionally suffered from a loss of light output due to the projection, as well as loss in resolution. In order to preserve the image quality, complex and hence commercially unattractive projection lenses have been developed having achromatic, astigmatic and color correction elements.

Several efforts have been made to reduce the complexity of the projection lens used in these systems, thus lowering the cost of the projection system. In U.S. Pat. No. 4,249,205, a simplified projection lens is described which permits a single element objective lens with one aspheric surface to be used in connection with a prism which combines the light output from three cathode ray tubes. The prism receives an image from a concave image generating surface shown to be a cathode ray tube.

The presence of a plano exit surface for the prism described in the aforesaid U.S. patent results, however, in aberrations to what is essentially a curved image surface exiting the prism. The curved image plane, having been generated by the curved cathode ray tube's phosphor surfaces when exiting the plano surfaces exhibits field aberration as well as astigmatic and achromatic aberration. To correct for such aberrations, additional lens elements are usually required.

The present invention further takes advantage of the use of images having curved image surfaces. The present invention will provide for an aplanatic image generating source wherein the exiting image is maintained in its curved form for further magnification, with only a minimum of achromatic and astigmatic aberration which requires correction.

SUMMARY OF THE INVENTION

It is an object of this invention to provide an aplanatic image combiner.

It is a more specific object of this invention to combine multiple images having curved image surfaces into a single image having a curved image surface.

These and other objects are carried out with apparatus in accordance with the present invention. At least two and preferably three cathode ray tubes provide the same image in a different primary color. The cathode ray tubes have a concave phosphor surface which generates images on a curved image surface. The curved image surface reduces the complexity in the projection lens structure as well as enhance total light output for a given aperture size.

The generated images are combined by crossed dichroic mirrors which are color selective. The combined image exits through a lens having a surface which may be plano facing said dichroic mirrors, and an opposite convex spherical surface. The spherical surface is selected to have a curvature symmetrical with the curvature of each cathode ray tube phosphor surface.

The resulting optical structure having symmetric input and output apertures forms an aplanatic element. The aplanatic structure forms the first element in the projection optics. The aplanatic element reduces spherical aberration and coma aberration found in prior art image combiners.

An aplanatic system is realized for the image combiner by including an exit lens for the image combiner having a convex spherical surface. The convex spherical surface has a radius of curvature substantially the same as each of the cathode ray tube radius of curvature. The spherical surface of the exit lens is located at or adjacent to one of two optical distances from the image generating surface of the CRT tube in order to achieve an aplanatic system.

The first of these optical distances requires the exit lens spherical surface to be spaced at a distance R equal to the radius of curvature for the spherical surface from the image generating surface of the CRT tube and the exit lens spherical surface. A second distance producing an aplanatic image condition requires that the spacing be at a distance equal to $R \cdot (1+n/n)$ where n is the index of refraction of the optical element. However, it has been found in practice that a quasi-aplanatic optical element is realized by spacing the spherical surface of the lens and image generating surface adjacent to, but not at, the aforesaid distances. This position lies within a range of 1.0 to 2.0 times R, the radius of the exit lens convex surface, provides for advantages in designing the magnification optics to follow.

In another embodiment of the invention, three primary color image generating cathode ray tubes are placed in line having parallel projection axes. The middle tube projection axis is located in line with the dichroic mirrors intersection, and coincident with the lens. Two planar mirrors are located at an angle with respect to each of the remaining cathode ray tubes for directing incident color images along a common projection axis perpendicular to said middle tube projection axis and dichroic mirror intersections.

BRIEF DESCRIPTION OF THE FIGURES

FIG. 3 shows astigmatic curves for the entire projection system of FIG. 2 demonstrating tangential and sagittal ray performance.

FIG. 4A demonstrates the modulation transfer function for the projection lens structure of FIG. 2 for different frequencies.

FIG. 4B demonstrates the modulation transfer function through focus for the axis and two additional points off axis at a single frequency.

DESCRIPTION OF THE PREFERRED EMBODIMENT

Figure 1:
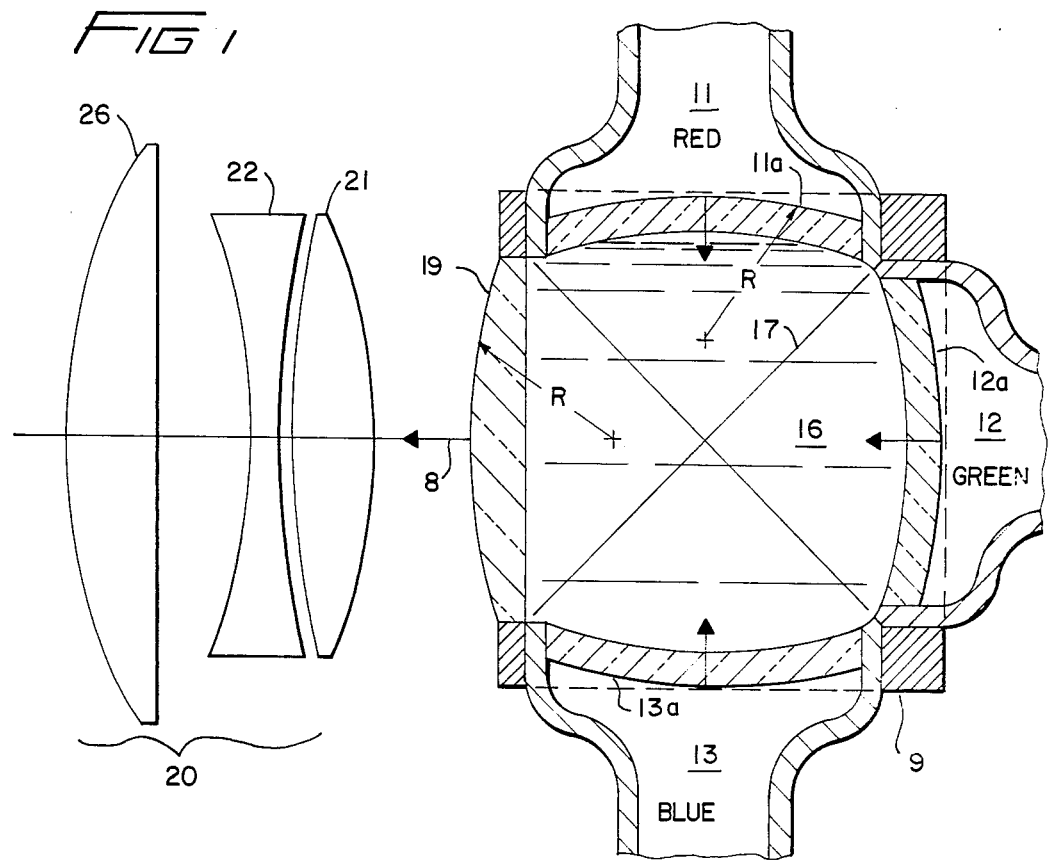
FIG. 1 shows an immersed three tube optical projection system in accordance with one embodiment of the invention.

Referring to FIG. 1, there is shown an aplanatic image combiner in accordance with a preferred embodiment of the invention. The aplanatic image combiner provides a curved input surface for receiving curved surfaces 11a, 12a and 13a, as well as a curved exit surface comprising the exterior surface of lens 19. In order to provide for an aplanatic condition the input and output surfaces are selected to have substantially symmetrical curvatures.

In the system shown in FIG. 1, three (3) cathode ray tubes 11, 12 and 13, generate an imge in its three constituent primary colors. Surfaces 11a, 12a and 13a are selected to be spherical in a preferred embodiment, but which may be aspherical, such that the concavity of the surfaces provide a curved image surface when the phosphors on surfaces 11a are excited by the electron beam of a respective tube. By including curved image generation surfaces, and an exit surface for the image combiner comprising lens 19, spaced from each other at a distance R which is the radius of curvature for each of surfaces 19, 12a, 13a, 11a, a substantially aplanatic image condition exists.

A substantially cubical enclosure 9 includes four sides, each having an aperture. Three of the sides receive a cathode ray tube 11, 12 or 13 and a fourth supports a lens 19. An immersion fluid 16 provides optical coupling between the CRT faceplates and a pair of dichroic mirrors 17.

The optical path for each of the images generated by the cathode ray tubes 11, 12 and 13 is through an immersion medium 16 which may be a mineral oil having good optical properties, with an index of refraction of substantially 1.45 to 1.55. The index of refraction of the immersion medium 16 is selected to provide for a minimum difference in index of refraction between the oil and the glass faceplate of each of the cathode ray tubes 11, 12 and 13. In the preferred embodiment, a cathode ray tube is selected having a 3 inch diagonal, and a radius of curvature of 91 mm.

A pair of crossed-dichroic mirrors 17 are used to combine the images from the individual cathode ray tubes 11, 12 and 13. The crossed-dichroic mirrors 17 are color-selective, providing a transmission of each of the incident cathode ray tube images in a known manner to the optical axis of the output lens 19 of the aplanatic image combiner.

The lens 19 has a spherical convex surface symmetrical with the concave spherical surface of the image generating surfaces of the each of the cathode ray tubes 11, 12 and 13. The input side of the output lens 19 is a plano surface, interfacing with the optical immersion medium 16. The output side of lens 19 has a radius of curvature substantially equal to the radius of curvature of the image generating surface of each cathode ray tube and is spaced at a distance of 1.0 to 2.0 times the radius of curvature R from each cathode ray tube image generating surface. The optical immersion medium 16 has been selected to have an index of refraction substantially the same as the glass used in manufacturing lens 19.

The lens 19 is selected to have an aperture which is at least 1× times the size of the image diagonal of each of the cathode ray tubes 11, 12 or 13. Typically, the aperture of lens 19 is selected to have a size of 1 to 1.5 times the image diagonal of each of the cathode ray tubes 11, 12 and 13. The lens 19 is spaced at an optical distance from each surface of cathode ray tubes 11, 12 and 13, at a distance of 1.0 to 2.0 times the radius of curvature of each of these surfaces. By utilizing this advantageous spacing, it is possible to capture a very high proportion of the total light output provided for each of the tubes 11, 12 and 13. The high proportion of luminous energy captured by lens 19 is in large measure the result of the curved image generating surfaces 11a, 12a and 13a of each of the cathode ray tubes, and the use of the lens 19 at an optical distance of 1.00 to 2.0 times the radius of curvature from each of these surfaces.

A true aplanatic element for the image combiner is realized when the spacing between the convex surface of lens 19, measured along the optical axis 8 thereof, and the image generating surface 12a is either R, the radius of curvature for the exit lens 19, or $R(1+n/n)$ where n is the index of refraction. As the optical elements for the combiner, including the immersion fluid 16, the glass for the CRT 11, 12 and 13, and the glass for the exit lens 19 are substantially the same, an aplanatic condition is realized for an index of refraction of substantially 1.50 at 1.67 times the radius of curvature R. As is known to those skilled in the art, an aplanatic condition will result when zero spherical aberration and zero comatic aberration are achieved for rays which emanate from a point lying on the optical axis 8 reaching surface 19a. The exit lens surface 19a would present an image which is free of spherical aberration and free of coma aberration when an aplanatic condition exits.

In the preferred embodiment, however, the surface 19a and image generating surfaces 11a, 12a and 13a are spaced at a distance 1.0 to 2 times the radius of curvature, excluding the distances R and 1.67 R, thereby providing a quasi-aplanatic optical element. The lens 19 produces some coma and spherical aberration when the quasi-aplanatic condition is achieved by spacing the spherical lens surface 19a an optical distance which is adjacent to each of the distances which produce a true aplanatic condition.

The quasi-aplanatic optical element produces some coma and spherical aberration. However, it has been found that the small amounts of coma aberration and spherical aberration are useful in designing the later projection lens 20 as they cancel aberrations in the elements of the projection lens 20. The image combiner has been found to work with multiple independent projection lens designs 20. The projection lens 20 may be selected for the desired focal length and magnification with only a minimum consideration of astigmatic correction. Due to the aplanatic image combiner, these corrections have been held to an absolute minimum. Correction for coma and astigmation is therefore slight, giving the lens designer an opportunity to simplify the remaining projection lens 20, avoiding costly correction elements which correct for chromatism, and comatism and radial distortion.

Figure 2:
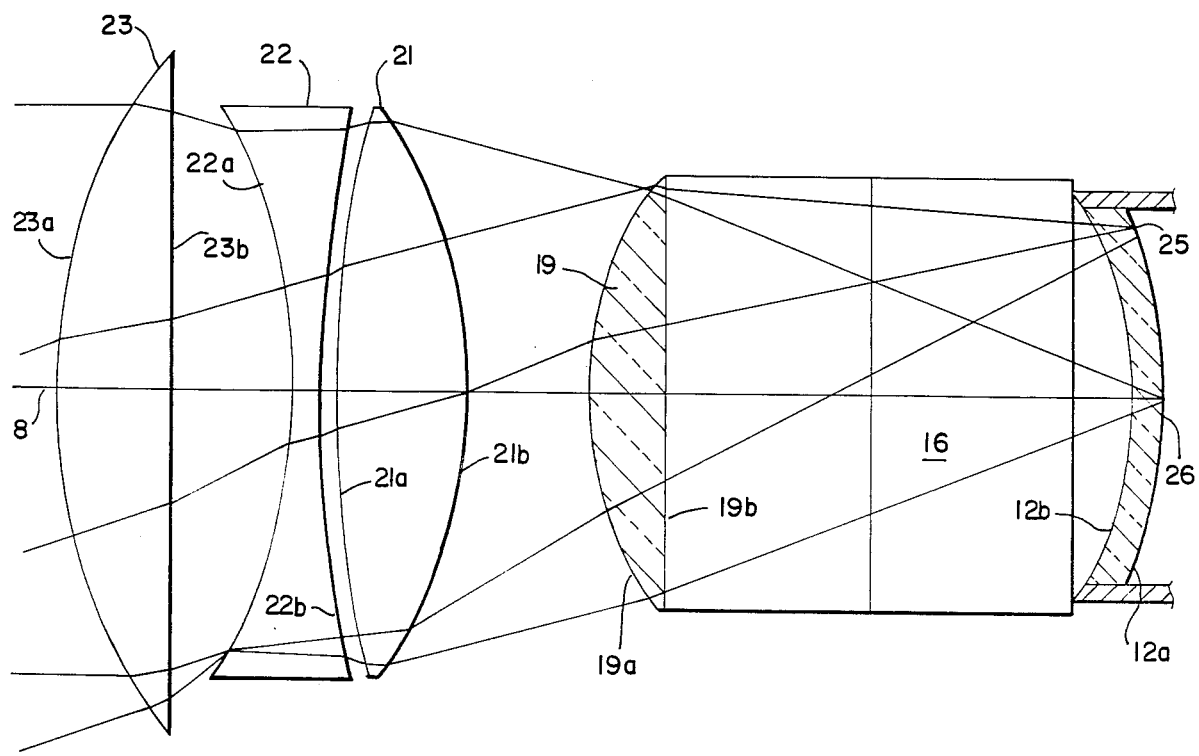
FIG. 2 is a ray diagram for the in-line CRT of FIG. 1.

FIG. 2 illustrates the curved optical surfaces which comprise the apparatus of FIG. 1. Rays are shown which originate with CRT 12 and which exit the lens element 19.

The projection lens configuration of FIG. 2 adds three elements, 21, 22, 23, which have been selected to have a 4-inch focal length, a speed of f/0.95 and a magnification of 10× to 80×.

Element 21 is BK7 glass with one spherical and one aspheric surface. Element 22 is SF2 glass with two spherical but concave surfaces. Element 23 is BK7 glass with one spherical and one almost plano surface.

Most significant is the absence of compound elements, such as achromats or astigmats, which are required in virtually all good quality prior art projection lenses.

In a preferred embodiment, each of the cathode ray tubes 11, 12 and 13 are supplied with a raster-scanned signal representing the red, green and blue derivatives from an encoded signal such as the NTSC standard of the U.S. or the PAL standard of Europe, used for commercial television broadcast.

The raster generated images of each of the tubes having been combined by lens 19 are magnified and projected by lens elements 21, 22 and 23.

Table I describes a prescription for this novel diffraction limited, high speed projection lens 20 of only three elements and image combiner that is unique in both performance and construction. The novel performance and simplified construction is a direct derivative of the achieved quasi-aplanatic condition, commensing with a curved focal surface 12a.

ter is available and is shown as the effective diameter in Table I. The remaining Table entries of Glass Type, Index of Refraction and VNO are standard optical parameters.

From the Table I, the distance between the surface 19a and 12a is seen by adding the thickness of lens element 19a to the thickness of the CRT faceplate 12 and the distances to the dichroic crossover plane. This distance can be seen to be 119.7 mm.

The radius of curvature for surface 19a is seen to be 77.52 mm. Thus, the distance is within the range of 1.0 to 2.0 times the radius of curvature, and adjacent the two distances 77.52, representing the first distance which produces an aplanatic condition, and a second distance proportional to $R \cdot (1+n/n)$ corresponding to 129.183 assuming n to be 1.5.

The foregoing example demonstrates that with an aplanatic image combiner, the freedom to design the additional projection lens elements 20 are due to the curve image surface presented to these elements. As the radius of curvature for lens 19 is known, its focal length may, of course, be readily determined. The focal length and magnification power of lens 19 being readily determinable permits a wide variety of projection lens 20 to

TABLE I

| Element Surface | Radius (mm) | Thickness Space (mm) | Effective Diameter | Actual Diameter | Glass Type | Index of Refraction | VNO |
|---|---|---|---|---|---|---|---|
| 23a | 112.1756 | 25.000 | 134.0 | 138.0 | SCHOTBK7 | 1.517 | 64.2 |
| 23b | −8886.00 | 24.73 | 134.0 | 138.0 | AIR | | |
| 22a | −119.0768 | 6.000 | 111.0 | 115.0 | SCHOTSF2 | 1.648 | 33.8 |
| 22b | 237.9006 | 3.0895 | 111.0 | 115.0 | AIR | | |
| 21a | 212.5304 | 28.000 | 111.0 | 115.0 | SCHOTBK7 | 1.517 | 64.2 |
| 21b | ASPHERIC | 25.4100 | 111.0 | 115.0 | AIR | | |
| 19a | 77.5194 | 15.5 | 84.0 | 88.0 | SCHOTK5 | 1.524 | 59.7 |
| 19b | PLANO | 42.000 | 84.0 | 88.0 | OIL | | |
| 16 | PLANO | 54.5842 | 84.0 | | | 1.485 | 53.7 |
| 12b | −83.3800 | 7.620 | 82.55 | 82.55 | OIL | 1.485 | 60.0 |
| 12a | −91.0000 | 0.000 | 82.55 | 82.55 | SPECLS8003 | 1.527 | |

The aspheric surface 21b is more specifically defined by the following standard lens prescription:

vertex radius = −92.2411 mm conic constant = −1.98870 polynomial aspherical coefficients
$$\begin{cases} Y^4 = -.9213308E\text{-}07 \\ Y^6 = -.4707993E\text{-}11 \\ Y^8 = -.4117614E\text{-}15 \\ Y^{10} = +.5872479E\text{-}19 \end{cases}$$

Table I identifies each optical surface of the system of FIG. 2 in the leftmost column. The radius of curvature for each surface is given in the adjacent column. The thickness of each element along the projection axis 8 is given in the column identified as THICKNESS, in the horizontal position of the first surface of each element. The second thickness measurement adjacent the second surface of each element is the space between adjacent elements, i.e., the space between 23 and 22 is 24.73 mm. The thickness dimension shown for optical surface 19b is the distance from plano surface 19b to the crossover plane of the dichroic mirrors. The dimension shown adjacent 16 is the distance from the dichroic crossover plane to the surface 12b.

The actual diameter of each element is given. Because of mounting considerations, less than the actual diamebe fabricated by the skilled lens designer. As the amount of correction necessary to avoid astigmatic and achromatic aberration seen in the prior art devices has been reduced to a minimum, the lens may be economically reduced to a very few elements.

The optical properties of the aplanatic image combiner and the projection lens described in FIG. 1 may be seen by referring to FIG. 2. FIG. 2 is a section view of the aplanatic image combiner of FIG. 1, showing ray diagrams for two radiating points 25, 26 on the surface of cathode ray tube 12, 12a. These two radiating points 25, 26 show rays which pass through the aplanatic image combiner. The selection of the components including the immersion fluid 16, such as to avoid any reflections from the interfaces of the optical elements, provides for a maximum light intensity transfer from the image generating surface 12a to the lens 19.

As FIG. 2 represents the rays from only a single cathode ray tube, the inline cathode ray tube 12, those skilled in the art will note that the ray diagrams for the orthogonal tubes 11 and 13 will, of course, be substantially the same and are therefore not shown.

The exit plane for lens 19 provides for bending of the optical rays as is expected in any lens having the convex surface of lens 19. The rays so bent are further transmitted by optical elements 21, 22 and 23. These optical elements provide for the additional magnification which the system designer desires, as well as the particular focal length found to be optimum for the projection system.

FIG. 3 indicates the performance of the complete projection system of FIG. 2, and shows the astigmatic surfaces indicative to the curved image surface produced by the aplanatic image combiner and the projection lens 20.

FIG. 4 illustrates the resolution performance of aplanatic combiner and lens 20 of FIG. 2. FIG. 4A shows the modulation transfer function through frequency for an axial object and two off axis object points. FIG. 4B shows the MTF through focus for a single frequency for an axial object and two off axis object points. These illustrations demonstrate the performance for three different field sizes representing 0%, 60% and 80% (1, 2, 3) of the available operative size.

Those skilled in the art will recognize this performance on axis is diffraction limited.

Figure 5:
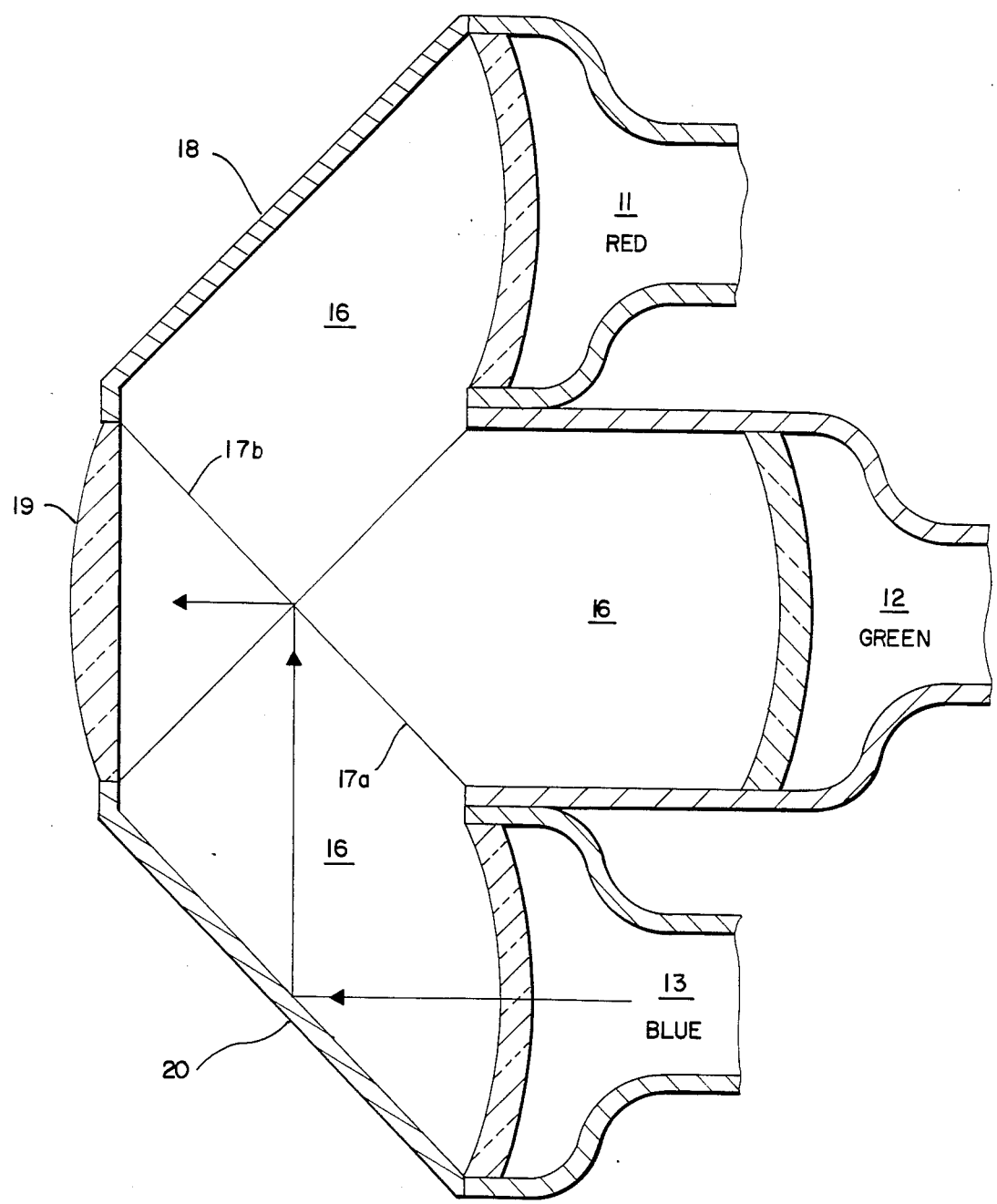
FIG. 5 illustrates another embodiment of the invention using three in-line cathode ray tubes.

Referring now to FIG. 5 there is shown yet another embodiment of the invention which demonstrates that the invention is not limited to the orthogonal and in-line CRT structure of FIG. 1. In FIG. 5, three (3) in-line cathode ray tubes are shown, an on-axis tube 12 and two offset parallel tubes 11 and 13. Each of the projection axes for the tubes are shown to be parallel and coplanar. The on-axis tube 12 has a projection axis which intersects the plane of the crossing point for the dichroic mirror 17, and the same as the lens. The embodiment of FIG. 5 is contemplated for a system projection speed of slower than the embodiment of FIG. 1.

Additional to the dichroic mirror 17 are two lateral mirrors 18 and 20. The remaining structure of the image combiner of FIG. 5 is, in all respects, similar to that of FIG. 1. A coupling medium 16 is selected to have an index of refraction which matches both the input image generating surface 12 and the output lens 19. As such, the optical path from the image generating surface 12 through the exit aperture represented by lens 19 is constant and provides for a maximum light transfer between the curved image plane originating at each of the cathode ray tubes 11, 12 and 13 and that exiting the lens 19.

Thus, there has been described an aplanatic image combiner which is not constrained to any particular orientation of input image generating means. Further, the projection lens elements following the aplanatic image combiner may be simple for the desired focal length and magnification by leaving a residual amount of aberrations in the image combiner. Additionally, the total light output available for projection has been increased by limiting the number of elements required for the projection lens.

Those skilled in the art will, of course, determine other embodiments which are defined more particularly by the claims which follow.

What is claimed is:

1. An aplanatic image combiner comprising:
   at least two image generating cathode ray tubes, said tubes having concave phosphor image generating surfaces for generating images on curved surfaces;
   means for combining said images into a single image having a curved image surface; and
   a lens positioned to transmit said combined image to an image magnification system, said lens having a curved surface forming an exit aperture which has substantially the same radius of curvature as said concave image generating surfaces, whereby an image is transmitted to said image magnification system.

2. The aplanatic image combiner of claim 1 wherein said lens includes a plano surface opposite said curved surface.

3. The aplanatic image combiner of claim 1 wherein said image magnification system comprises a multiplicity of spaced apart optical elements which magnify said combined image from said lens and which do not include any means for correcting for chromatism and comatism.

4. The aplanatic image combiner of claim 3 wherein said image magnification system has a magnification of 10× to 80×.

5. The aplanatic image combiner of claim 1 further comprising: a coupling medium for immersing said lens, means for combining, and cathode ray tubes, said coupling medium having an index of refraction substantially the same as said lens.

6. The image combiner of claim 1 or 3 wherein said cathode ray tubes generate primary color images, and wherein said means for combining comprises first and second color-selective mirrors positioned to reflect the primary color images generated by associated ones of said cathode ray tubes.

7. An aplanatic image combiner comprising:
   first, second, and third primary color image generating cathode ray tubes, each of said tubes having a concave image generating surface, said tubes facing in the same direction and having parallel longitudinal projection axes in a common plane;
   a pair of color selective crossed dichroic mirrors which intersect along the axis of said second cathode ray tube;
   first and second mirrors facing at an angle to the remaining first and third cathode ray tube projection axes, and facing at an angle to direct images from said first and third cathode ray tubes along an axis perpendicular to said second cathode ray tube axis, said mirrors cooperating to combine the images from said first and third cathode ray tubes with an image from said second cathode ray tube, and to direct the combined image in the direction of the second cathode ray tube axis; and
   a lens having a central projection axis coincident with said second cathode ray tube axis, having a convex surface with a curvature substantially the same as said cathode ray tube image generating surfaces and forming exit aperture therewith whereby an image is transmitted along said second cathode ray tube axis.

8. The image combiner of claim 7 comprising a coupling medium for interfacing said lens, mirrors and cathode ray tubes.

9. The image combiner of claim 8 wherein said coupling medium has an index of refraction substantially equal to said lens.

10. The image combiner of claim 1 or 7 wherein said cathode ray tube images generating surfaces are aspheric.

11. The image combiner of claim 1 or 7 wherein said cathode ray tube image generating surfaces are spherical.

12. The image combiner of claim 11 wherein said lens is positioned to be at an optical distance of 1.0 to 2.0 times the radius of curvature of said spherical surfaces from said image generating surfaces of said cathode ray tubes.

13. In a system for generating a composite curved image of two or more curved image surfaces, a single magnification lens comprising a multiplicity of optical lens elements positioned to receive on an entrance surface said composite curved image, said optical lens elements magnifying said composite curved image without requiring correction for chromatism and radial distortion.

14. The system of claim 13 wherein said multiplicity of optical lens elements comprises three elements.

* * * * *